United States Patent [19]

Russo

[11] 4,026,673

[45] May 31, 1977

[54] APPARATUS FOR DISSOLVING AND DISPENSING FERTILIZER TO EITHER OF TWO WATER STREAMS OF DIFFERENT PRESSURE

[76] Inventor: Leonard Russo, 177 Canal St., San Rafael, Calif. 94901

[22] Filed: May 29, 1975

[21] Appl. No.: 581,991

[52] U.S. Cl. .......................... 23/272 AH; 23/272.8; 71/64 C; 137/268; 239/310

[51] Int. Cl.² .......................................... B01D 11/02

[58] Field of Search ........... 71/64 C; 239/310, 312; 137/268; 23/272, 272.6, 267 E, 272.7, 272.8, 272 AH, 271; 259/36

[56] References Cited

UNITED STATES PATENTS

| | | | |
|---|---|---|---|
| 664,387 | 12/1900 | Doderlein | 23/272 |
| 2,239,502 | 4/1941 | Gleason | 23/272.7 |
| 2,501,260 | 3/1950 | Brodin | 23/272.7 |
| 3,129,172 | 4/1964 | Dickey | 23/272.8 |
| 3,378,027 | 4/1968 | Fredericks | 137/268 |
| 3,574,559 | 4/1971 | Kryzer | 23/272.7 |

FOREIGN PATENTS OR APPLICATIONS

| | | | |
|---|---|---|---|
| 288,421 | 5/1953 | Switzerland | 23/272.6 |
| 128,351 | 6/1919 | United Kingdom | 23/272 |

*Primary Examiner*—Stephen J. Emery
*Attorney, Agent, or Firm*—Townsend and Townsend

[57] ABSTRACT

Apparatus for introducing a preselected quantity of soluble fertilizer into a water stream in a fully dissolved state is disclosed. The apparatus includes a tank and a porous receptacle disposed within the tank and adapted to receive the fertilizer. The bottom of the receptacle is spaced upwardly from the bottom of the tank to provide a plenum volume beneath the receptacle at the bottom of the tank. Water is dispensed in a dispersed state onto the soluble fertilizer in the porous receptacle. The water drains through the fertilizer to dissolve it and the water containing the dissolved fertilizer passes through the porous receptacle and is collected in the plenum volume at the bottom of the tank. A float is provided for sensing the level of water in the plenum volume. A valve is connected to the float and interrupts the dispensing of water to the fertilizer when the level of water approaches the bottom of the porous receptacle. An outlet is provided at the bottom of the tank to supply the water containing the dissolved fertilizer in the plenum volume to the water stream.

4 Claims, 2 Drawing Figures

APPARATUS FOR DISSOLVING AND DISPENSING FERTILIZER TO EITHER OF TWO WATER STREAMS OF DIFFERENT PRESSURE

BACKGROUND OF THE INVENTION

The present invention relates to apparatus for introducing a preselected quantity of soluble fertilizer into a water stream in a fully dissolved state.

One of the problems involved in using chemical or other types of dry fertilizer is dispensing the fertilizer evenly over the area to be fertilized. To this end it has been found desirable that the fertilizer be dissolved in water before it is applied to lawns or plants. The water containing the dissolved fertilizer is then sprinkled or otherwise used to irrigate the plant life and the plants are thereby fertilized as well.

A variety of different types of devices have been developed to dissolve the fertilizer in the water so that it can be sprinkled onto lawns or otherwise dispensed as desired. In most such devices, the fertilizer is merely introduced into a tank of water and agitated to dissolve the fertilizer before sprinkling the water on the plant life. In others, the fertilizer is introduced into a chamber which is incorporated directly into the water stream so that the fertilizer is entrained in the water stream and thereafter dispensed as desired.

In each of the types of devices described above for introducing dry fertilizer into a water stream, the fertilizer is immersed directly into a relatively small quantity of water. The water containing the dissolved fertilizer is only a small portion of the water used for irrigation purposes, and the fertilizer in this water is highly concentrated. If the water containing the dissolved fertilizer is introduced instantaneously into a water stream and dispensed onto plant life, a relatively high concentration of such fertilizer will be dispensed in certain areas, and relatively little fertilizer is dispensed in other areas. Where the high concentration of fertilizer is dispensed, the plants may be damaged by "fertilizer burn", and the plants which receive little or no fertilizer will not receive the benefits of being fertilized.

In an attempt to avoid the instantaneous introduction of concentrated fertilizer mentioned above and the problems associated therewith, various types of systems have been devised to meter the introduction of the water containing the relatively highly concentrated fertilizer into the water stream. However, such devices have been relatively complex and subject to failure, and thus have not achieved wide acceptance in the art.

SUMMARY OF THE INVENTION

The present invention provides apparatus for introducing a preselected quantity of soluble fertilizer into a water stream in a fully dissolved state. The apparatus includes a tank and a porous receptacle adapted to receive fertilizer. The bottom of the receptacle is spaced upwardly from the bottom of the tank to provide a plenum volume beneath the receptacle at the bottom of the tank. Water is dispensed into the soluble fertilizer in the porous receptacle. The water drains through the fertilizer to dissolve it and the water containing the dissolved fertilizer passes through the porous receptacle and is collected in the plenum volume at the bottom of the tank. The level of water containing the dissolved fertilizer in the plenum volume is prevented from reaching the porous receptacle. The water containing the dissolved fertilizer is removed from the tank and injected into the water stream.

With the apparatus of the present invention, the dry fertilizer is never immersed directly into a body of water. Rather, a relatively small amount of water is dispensed into the fertilizer, and the water containing the dissolved fertilizer collects below the receptacle containing the remaining fertilizer. Only a relatively small amount of the dry fertilizer is dissolved in a given amount of time, and all of the fertilizer is not dissolved immediately as with the devices in the prior art. The entire amount of fertilizer is thus not concentrated in a given volume of water, and no metering system is required to control the flow of water containing the dissolved fertilizer into the water stream. Hence, the complex metering devices found in the prior art are not required with the apparatus of the present invention.

The novel features which are believed to be characteristic of the invention, both as to organization and method of operation, together with further objects and advantages thereof will be better understood from the following description considered in connection with the accompanying drawings in which a preferred embodiment of the invention is illustrated by way of example. It is to be expressly understood, however, that the drawings are for the purpose of illustration and description only and are not intended as a definition of the limits of the invention.

DESCRIPTION OF THE PREFERRED EMBODIMENT

Figure 1:
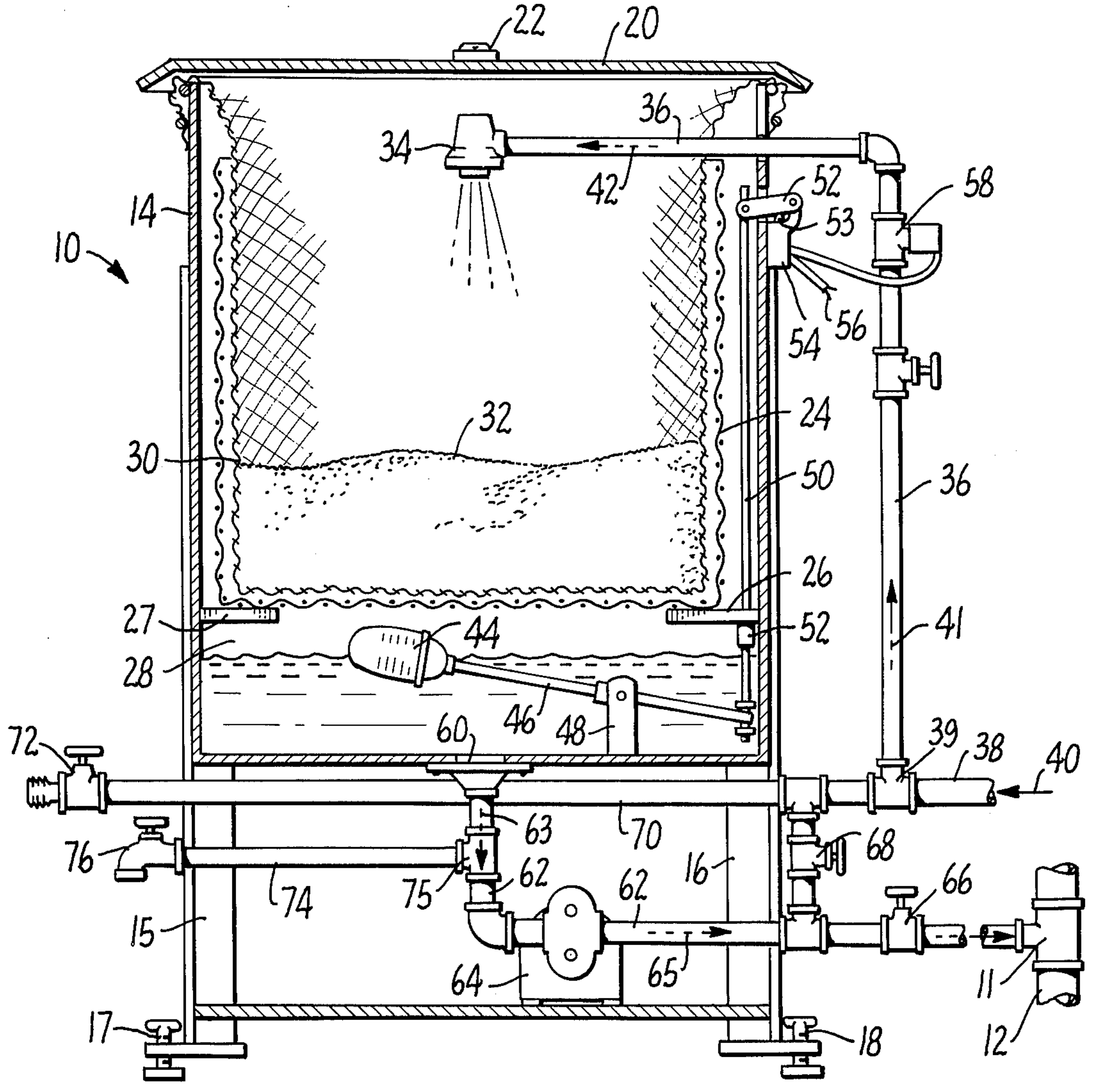
FIG. 1 is a side elevation and partial sectional view of the preferred embodiment of the present invention in the configuration used for dispensing dissolved fertilizer in the relatively large water stream.

The preferred embodiment 10 of the present invention and the manner in which this embodiment is used to dispense dissolved fertilizer in a relatively large water stream is illustrated in FIG. 1. In this configuration, apparatus 10 is connected by T-fitting 11 to a relatively large conduit 12 containing a high pressure water stream. Conduit 12 can lead to a plurality of sprinklers which sprinkle water over a relatively large area for irrigation purposes, or to other types of irrigation systems. For example, in this configuration the preferred embodiment 10 could be used to spread fertilizer over golf courses, large fields, and the like.

Apparatus 10 includes a tank 14 supported on legs 15, 16. Legs 15, 16 include adjustable feet 17, 18, which allow for adjustment of the tank 14 until it is exactly level. A cover 20 can be fitted over tank 14 and includes a bubble indicator 22 for use in insuring that the tank is perfectly level.

A porous receptacle 24 is located within tank 10, and is supported on flanges 26, 27 extending inwardly from the inside walls of tank 14. The bottom of porous receptacle 24 is spaced upwardly from the bottom of tank 14 to provide a plenum volume 28 at the bottom of the tank beneath the porous receptacle.

A filter 30 is disposed within porous receptacle 24 and extends over the upper edges of tank 14. A preselected quantity of dry, soluble fertilizer 32, usually chemical fertilizer, is placed in porous receptacle 24.

In order to dissolve the soluble fertilizer 32 in porous receptacle 24, a sprinkler head 34 is located at the upper end of the receptacle over the fertilizer. Sprinkler head 34 is connected to a pipe 36 to supply water to the sprinkler head so that the water can be dispensed onto the fertilizer in a dispersed state. Supply pipe 36 is in turn connected to a water pipe 38 by T-fitting 39. Pipe 38 is connected to a relatively low pressure water supply so that water flows into pipe 38 as illustrated by arrow 40 and through water supply pipe 36 as illustrated by arrows 41, 42 to the sprinkler head. T-fitting 39 also connects pipe 38 to a manifold 70, but valve 72 at the terminus of manifold 70 is closed in the configuration of FIG. 1 to prevent the flow of water through the manifold.

As the water is dispensed onto soluble fertilizer 32 by sprinkler head 34, the water dissolves the fertilizer and the water containing the dissolved fertilizer passes through porous receptacle 24 and collects in the plenum volume 28 at the bottom of tank 14. Any chunks which may have formed in the fertilizer are trapped by filter 30 until fully dissolved. It is desirable to insure the level of the water collected in the bottom of the tank 14 does not rise to the level of the bottom of the porous receptacle, which would result in caking of the fertilizer in the receptacle. To this end a float 44 is located in the plenum volume 28 at the bottom of tank 14. A pivotal arm 46 is attached to float 44 and pivots about support 48. A rod 50 is connected to pivotal rod 46 opposite from float 44 and is maintained in a vertical configuration by sleeve 52. The upper end of rod 50 is connected to a linkage 52 overlying the trigger 53 of a solenoid control 54. Solenoid control 54 is powered by electric current through line 56 and controls a solenoid valve 58 interposed in water supply 36.

When the water level in the plenum volume 28 at the bottom of tank 14 rises and approaches the bottom of porous receptacle 44, as illustrated in FIG. 1, float 44 will move upwardly, drawing rod 50 downwardly until armature 52 depresses the trigger 53 of solenoid control 54.

When trigger 53 is depressed, solenoid control 54 will actuate solenoid valve 58 to close the valve so that water cannot flow to sprinkler head 34 and will not be dispensed onto soluble fertilizer 32. However, when the level of water in the bottom of tank 14 decreases as the water drains from the tank, float 44 will drop and trigger 53 will be disengaged, opening solenoid valve 58 so that more water can be dispensed onto the soluble fertilizer to collect at the bottom of tank 14. Thus a constant supply of water containing dissolved fertilizer is provided while the level of such water is controlled so that it does not contact the dry fertilizer directly.

An outlet 60 is located at the bottom of tank 14 and outlet pipe 62 is connected to outlet 60. The water containing the dissolved fertilizer which collects at the bottom of tank 14 passes through the outlet and into outlet pipe 62 as illustrated by arrow 63. A pump 64 is interposed in outlet pipe 62 and increases the pressure of the water therein so that the water containing the dissolved fertilizer flows through the remainder of outlet pipe 62 as illustrated by arrow 65 and through open valve 66. Pipe 62 is connected to conduit 12 by T-fitting 11 so that the water containing dissolved (or entrained) fertilizer flows into the conduit which contains a relatively high pressure water stream.

It should be noted that when apparatus 10 is used to introduce water containing dissolved fertilizer into conduit 12, valve 68 is closed to prevent the water containing the dissolved fertilizer from flowing into manifold 70. Also, as noted above, valve 72 is closed so that the water entering manifold 70 through pipe 38 is blocked and flows through water supply pipe 36 to sprinkler head 34.

A drain pipe 74 is connected to outlet pipe 62 by T-fitting 75. A faucet 76 is located at the terminus of drain pipe 74, and the faucet is closed during operation of apparatus 10 to prevent the escape of water containing dissolved fertilizer through the drain pipe. When the operation of apparatus 10 has terminated, faucet 76 can be opened to drain the remaining liquid from the bottom of tank 14.

Figure 2:
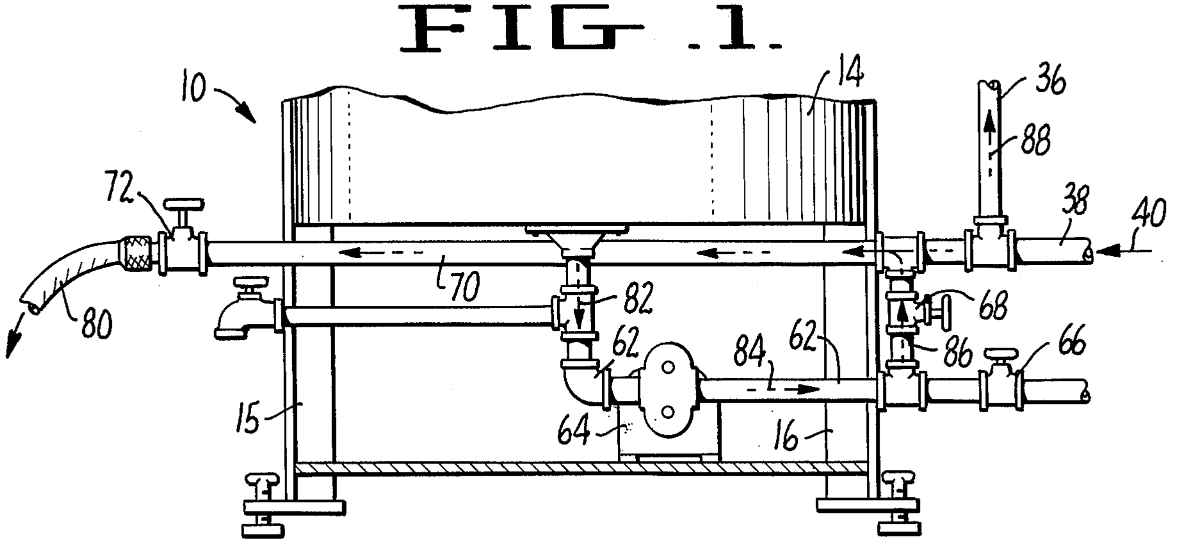
FIG. 2 is a fragmentary elevation view of the apparatus of the present invention as used to dispense dissolved fertilizer in a relatively small water stream.

The apparatus 10 of the present invention can also be used to introduce dissolved fertilizer into a relatively lower pressure water stream, as illustrated in FIG. 2. The low pressure water stream is typically used to irrigate a small area such as a lawn. The low pressure water stream is carried in a conduit 80 which is connected to manifold 70, and valve 72 is opened so that the water can flow from the manifold to conduit 80. Valve 66 is closed so that the water containing the dissolved fertilizer does not flow to the large conduit, and valve 68 is opened so that such water flows from pump 64 into manifold 70. In this configuration, the water containing the dissolved fertilizer passes out of tank 14 through outlet pipe 62, as illustrated by arrow 82, is pumped through the remainder of outlet pipe 62, as illustrated by arrow 84, passes upwardly through the connector pipe 86 and into manifold 70.

When the apparatus 10 of the present invention is configured as illustrated in FIG. 2 to supply dissolved fertilizer to low pressure conduit 80, water is supplied to the apparatus through pipe 38 as illustrated by arrow 40, as is the case when dissolved fertilizer is supplied to a large water stream. A portion of the water entering through water pipe 38 passes upwardly through water supply pipe 36, as illustrated by arrow 88, to the sprinkler head. The remainder of the water entering apparatus 10 through water pipe 38 passes into manifold 70, in which it is mixed with the water containing the dissolved fertilizer passing into the manifold from pipe 86. This water then passes through manifold 70 and into low pressure conduit 80 to supply the dissolved fertilizer in the low pressure water stream.

In operation, apparatus 10 can be used either to supply dissolved fertilizer to a large conduit such as 12, containing a relatively high pressure water stream, or a smaller diameter conduit 80 containing a relatively low pressure water stream. In each case, a preselected quantity of dry, soluble fertilizer 32 is placed within porous receptacle 24, which lined with filter 30.

The apparatus is connected by pipe 38 to a low pressure water supply. At least a portion of the water entering through water pipe 38 passes upwardly through water supply pipe 36 to sprinkler head 34 which dispenses it in a dispersed state onto the soluble fertilizer. Water containing the fertilizer in a fully dissolved state seeps through porous receptacle 24 and collects in the plenum volume 28 at the bottom of tank 14. When the level of the water containing the dissolved fertilizer in the plenum volume approaches the bottom of porous receptacle 24, solenoid valve 58 is actuated to cut off further supply of water to the sprinkler head until the water level at the bottom of the tank drops. As a result, the dry fertilizer is not directly immersed in the water and does not become caked, minimizing the formation of chunks of undissolved fertilizer. Those chunks which do form are trapped by filter 30 until they dissolve fully.

When the water containing the dissolved fertilizer is to be supplied into a relatively large conduit such as 12, which provides the water supply to a large irrigation system, conduit 12 is connected to outlet pipe 62. Valve 66 is opened to allow the water to flow from the plenum volume 28 at the bottom of tank 14 into conduit 12, and valves 68 and 72 are closed. When the water containing the dissolved fertilizer is to be supplied to a relatively small diameter conduit 80, which supplies water to a small irrigation system, conduit 80 is connected to manifold 70. Valve 66 is closed and valves 68 and 72 are opened so that the water containing the dissolved fertilizer flows from the plenum volume into manifold 70 to mix with the water entering through water pipe 38 and thereafter flow into conduit 80.

While a preferred embodiment of the present invention has been illustrated in detail, it is apparent that modifications and adaptations of the embodiment will occur to those skilled in the art. However, it is to be expressly understood that such modifications and adaptations are within the scope of the present invention as set forth in the following claims.

What is claimed as new is:

1. Apparatus for introducing a preselected quantity of soluble fertilizer alternatively into either a first relatively high pressure water stream or a second relatively low pressure water stream in a fully dissolved state, said apparatus comprising:

a tank;

a porous receptacle disposed within the tank and adapted to receive the quantity of soluble fertilizer therein, the bottom of said receptacle being spaced upwardly from the bottom of said tank to provide a plenum volume beneath the receptacle at the bottom of the tank;

a sprinkler head superimposed over the soluble fertilizer in the porous receptacle;

a water supply pipe connected between the second water stream and the sprinkler head for dispensing water in a dispersed state onto the soluble fertilizer in the porous receptacle so that the dispensed water dissolves the fertilizer and passes through the porous receptacle to collect in the plenum volume at the bottom of the tank;

a filter lining in the inner surface of the porous receptacle to prevent passage of undissolved fertilizer through said receptacle;

a float located in the plenum volume to indicate the level of the water containing the dissolved fertilizer at the bottom of the tank;

valve means including a valve interposed in the water supply pipe and means connecting the valve to the float so that the flow of water through the water supply pipe to the sprinkler head is interrupted when the float approaches the bottom of the porous receptacle;

an outlet manifold having an inlet and a first outlet which is connectable to said first water stream and a second outlet which is connectable to said second water stream whereby the water containing the dissolved fertilizer can be alternatively supplied to either water stream;

an outlet pipe having one end connected to the tank at the plenum volume and a second opposite end connected to the inlet of said outlet manifold a pump interposed in the outlet pipe and adapted to force the water containing the dissolved fertilizer through said outlet pipe; and means connected to the outlet pipe upstream of the pump for draining the plenum volume when the apparatus is not in use.

2. Apparatus for introducing a preselected quantity of soluble fertilizer alternatively into either a first relatively high pressure water stream or a second relatively low pressure water stream in a fully dissolved state, said apparatus comprising:

a tank;

a porous receptacle disposed within the tank and adapted to receive the quantity of soluble fertilizer therein, the bottom of said receptacle being spaced upwardly from the bottom of said tank to provide a plenum volume beneath the receptacle at the bottom of the tank;

a sprinkler head superimposed over the soluble fertilizer in the porous receptacle;

a water supply pipe connected between the second water stream and the sprinkler head for dispensing water in a dispersed state onto the soluble fertilizer in the porous receptacle so that the dispensed water dissolves the fertilizer and passes through the porous receptacle to collect in the plenum volume at the bottom of the tank;

a float located in the plenum volume to indicate the level of the water containing the dissolved fertilizer at the bottom of the tank;

valve means including a valve interposed in the water supply pipe and means connecting the valve to the float so that the flow of water through the water supply pipe to the sprinkler head is interrupted when the float approaches the bottom of the porous receptacle;

an outlet manifold having an inlet and a first outlet which is connectable to said first water stream and a second outlet which is connectable to said second water stream whereby the water containing the dissolved fertilizer can be alternatively supplied to either water stream;

an outlet pipe having one end connected to the tank at the plenum volume and a second opposite end connected to the inlet of said outlet manifold; and a pump interposed in the outlet pipe and adapted to force the water containing the dissolved fertilizer through said outlet pipe;

3. Apparatus as recited in claim 2 and additionally comprising a filter lining in the inner surface of the porous receptacle to prevent passage of undissolved fertilizer through said receptacle.

4. Apparatus as recited in claim 2 and additionally comprising means connected to the outlet pipe upstream of the pump for draining the plenum volume when the apparatus is not in use.

* * * * *